(12) United States Patent
Zetterlund et al.

(10) Patent No.: US 7,457,237 B2
(45) Date of Patent: Nov. 25, 2008

(54) SHARED RISK GROUP HANDLING WITHIN A MEDIA GATEWAY

(75) Inventors: Jerker Mattias Zetterlund, Hägersten (SE); Paul R. Wilson, Dallas, TX (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 790 days.

(21) Appl. No.: 10/770,948

(22) Filed: Feb. 3, 2004

(65) Prior Publication Data

US 2004/0218612 A1 Nov. 4, 2004

Related U.S. Application Data

(60) Provisional application No. 60/444,525, filed on Feb. 3, 2003.

(51) Int. Cl.
*G01R 31/08* (2006.01)
*G06F 11/00* (2006.01)

(52) U.S. Cl. ..................... 370/225; 370/242

(58) Field of Classification Search ............... 370/216, 370/225

See application file for complete search history.

(56) References Cited

U.S. PATENT DOCUMENTS

| | | | |
|---|---|---|---|
| 6,944,280 B2 * | 9/2005 | Suzuki | 379/229 |
| 7,042,835 B1 * | 5/2006 | de Boer et al. | 370/222 |
| 2001/0032271 A1 | 10/2001 | Allen | |
| 2002/0030864 A1 | 3/2002 | Chaudhuri et al. | |
| 2002/0038373 A1 * | 3/2002 | Border et al. | 709/230 |
| 2002/0191545 A1 * | 12/2002 | Pieda et al. | 370/238 |
| 2004/0010653 A1 * | 1/2004 | Grundy et al. | 710/315 |

OTHER PUBLICATIONS

ITU—T H.248.1 (May 2002); Series H: Audiovisual and Multimedia Systems Infrastructure of audiovisual services—Communication procedures; Gateway contro I protocol: Version 2.

Juniper Networks; K. Kompella, Y. Rekhter; OSPF Extensions in Support of Generalized Multi-Protocol Label Switching; Oct. 2003; draft-ietf-ccamp-ospf-gmpls-extensions-12.txt.

CY Lee, A. Farrel, S. De Cnodder; Exclude Routes—Extension to RSVP-TE; Nov. 2002; draft-lee-ccamp-rsvp-te-exclude-route-01. txt.

Series H: Audiovisual and Multimedia Systems et al: "H.248: Gateway Control Protocol; excerpted pp. 5 to 12, and 46 to 49; pages renumbered as pp. 1 to 13" ITU-T Recommendation H.248 XX, XX, Jun. 2000, pp. 1-13, XP002227748 p. 2-12 (Enclosed is H248.1, which supercedes H248. See attached memo for further explanation. ).

(Continued)

*Primary Examiner*—Kwang B. Yao
*Assistant Examiner*—Tung Q Tran
(74) *Attorney, Agent, or Firm*—Michael Cameron (57) ABSTRACT

A media gateway controller (MGC) is described herein that implements a shared risk group package to control and prevent a media gateway (MG) from establishing redundant links like a primary link and a secondary link that use resources that share the same risk of failure. Essentially, the MGC uses the shared risk group package to control which resources like ephemeral terminations are used by the MG to establish the primary link and the secondary link such that if any of the resources associated with the primary link fail then the secondary link remains operational within the MG and if any of the resources associated with the secondary link fail then the primary link remains operational within the MG.

2 Claims, 4 Drawing Sheets

OTHER PUBLICATIONS

Telecommunication Standardization Sector of ITU: "ITU-T Recommendation H.248.22 Gateway Control Protocol: Shared Risk Group package" ITU-T, 'Online! Jul. 2003, pp. 1-11, XP002285059 Series H.

* cited by examiner

SHARED RISK GROUP HANDLING WITHIN A MEDIA GATEWAY

CLAIMING BENEFIT OF PRIOR FILED PROVISIONAL APPLICATION

This application claims the benefit of U.S. Provisional Application Ser. No. 60/444,525 filed on Feb. 3, 2003 and entitled "Shared Risk Group Handling within a Data Packet Communications Network" which is incorporated by reference herein.

BACKGROUND OF THE INVENTION

1. Field of the Invention

The present invention relates in general to the telecommunications field and, in particular, to a media gateway that implements a shared risk group package to indicate to a media gateway whether or not the media gateway should use resources which share the same risk of failure to establish multiple connections.

2. Description of Related Art

In the telecommunications field it is an established and common concept that to improve the error resilience of a connection that one should use redundant links like a primary link and a secondary link. The establishment of a secondary link effectively means that a separate group of resources are used to establish a connection so that if the resources of the primary link fail then the resources of the secondary link maintains the connection. Today there is ongoing work in the Internet Engineering Task Force (IETF) of using diverse resources in a router and network. For example, see the following articles:

Kireeti Kompella et al. "OSPF Extensions in Support of Generalized Multi-Protocol Label Switching" Internet Draft draft-ietf-ccamp-ospf-gmpls-extensions-12.txt dated October 2003.

Dimitri Papadimitriou et al. "Shared Risk Link Groups Inference and Processing" Internet Draft draft-papadimitriou-ccamp-srlg-processing-02.txt dated June 2003.

The methods described in these articles disclose the use of diverse resources to maintain a connection within a router and network but there is no method today that enables the use of diverse resources for a connection in a media gateway (MG). Instead, today in a typical packet based network the MG is requested to provide a Termination ID for a primary link using an ADD.req command with a Termination ID=CHOOSE (?). The MG is then requested to provide another Termination ID for a secondary link using another ADD.req command with a Termination ID=CHOOSE (?). It is likely that the terminations used by the primary link and the second link use related resources in the MG such that in the case of a failure of any of those resources then both the primary link and secondary link would be adversely affected. This is clearly undesirable behavior because a secondary link has been established in the first place to minimize the possibility of failure to a connection. Thus a mechanism is needed to inform the MG that it should use resources to establish a secondary link that are not related to the resources used to establish the primary link. This need is satisfied by the shared risk group package of the present invention.

BRIEF DESCRIPTION OF THE INVENTION

The present invention includes a media gateway controller (MGC) that implements a shared risk group package to control and prevent a media gateway (MG) from establishing redundant links like a primary link and a secondary link that use resources that share the same risk of failure. Essentially, the MGC uses the shared risk group package to control which resources like ephemeral terminations are used by the MG to establish the primary link and the secondary link such that if any of the resources associated with the primary link fail then the secondary link remains operational within the MG and if any of the resources associated with the secondary link fail then the primary link remains operational within the MG. The present invention described herein also includes: (1) a method for implementing the shared risk group package; (2) a media gateway; and (3) a network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
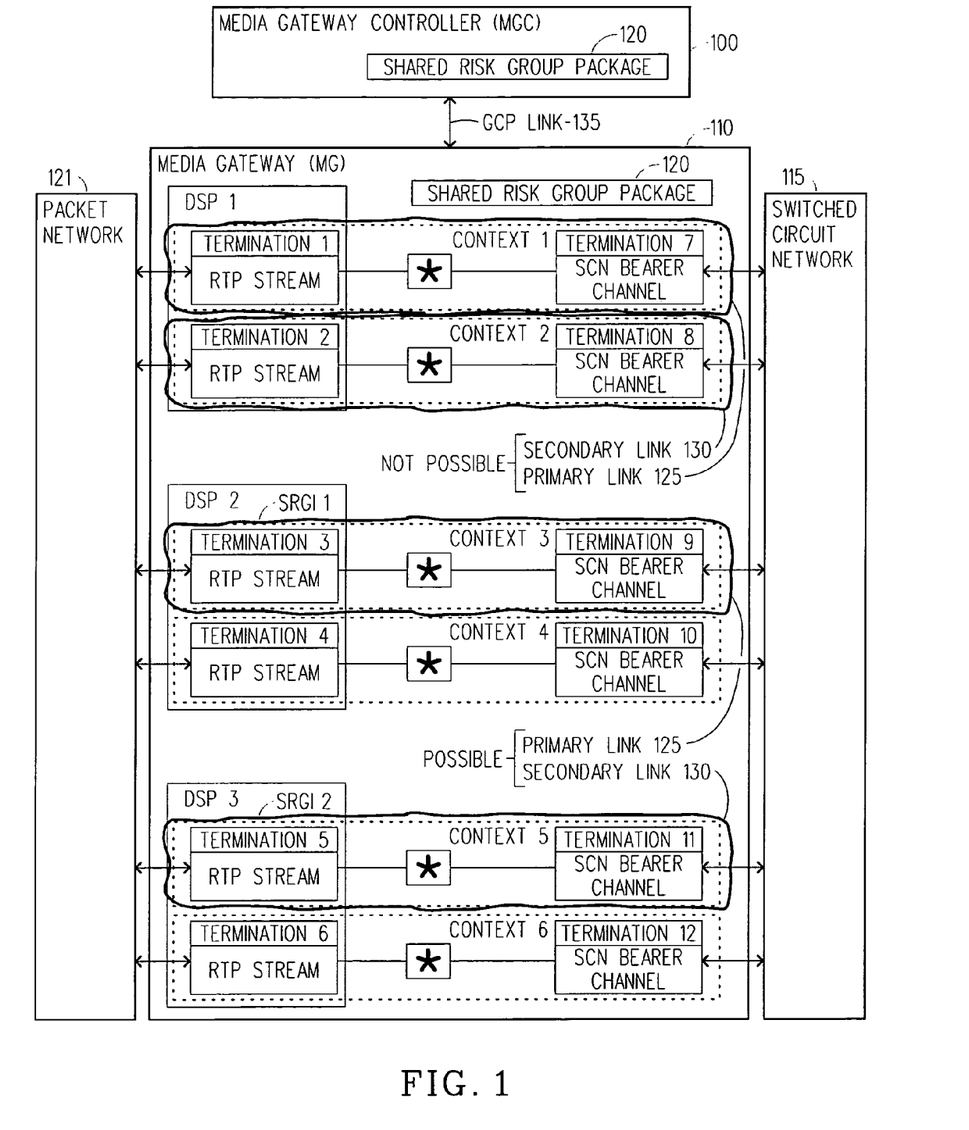
FIG. 1 is a block diagram showing the basic components of a MGC and a MG that implement a shared risk group package of the present invention.
Figure 2:
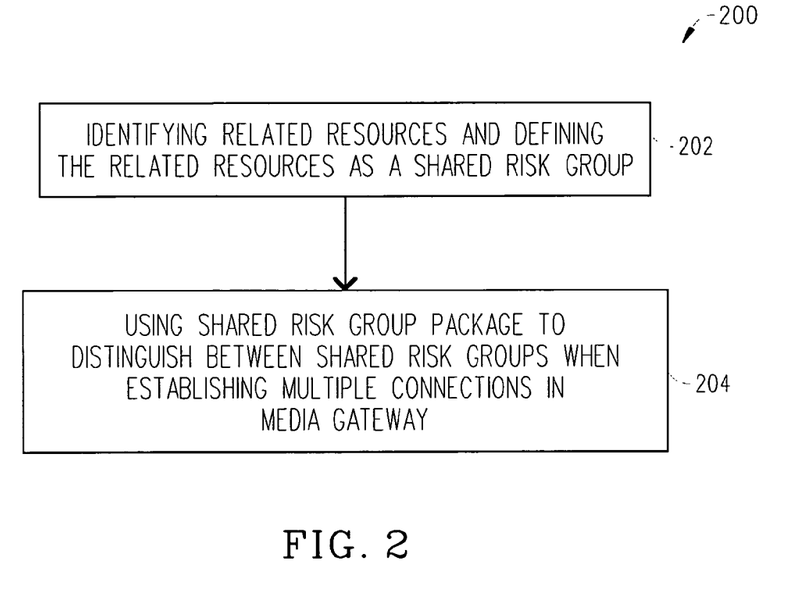
FIG. 2 is a flowchart illustrating the steps of a preferred method for enabling the MGC to control the resources used in the MG to prevent redundant links from being established which use resources that share the same risk of failure by implementing the shared risk group package in accordance with the present invention.

Referring to FIGS. 1 and 2, there are shown preferred embodiments of a MGC 100 and MG 110 that implement the shared risk group package 120 of the present invention and a method 200 for implementing the shared risk group package 120 of the present invention. For clarity, a detailed discussion about the shared risk group package 120 is provided after a brief discussion about the basic components and functions of the MGC 100 and the MG 110. It should also be appreciated that for clarity the description provided below in relation to the MGC 100 and MG 110 omits those details and components that are well known in industry and are not necessary to understand the present invention.

Figure 4:
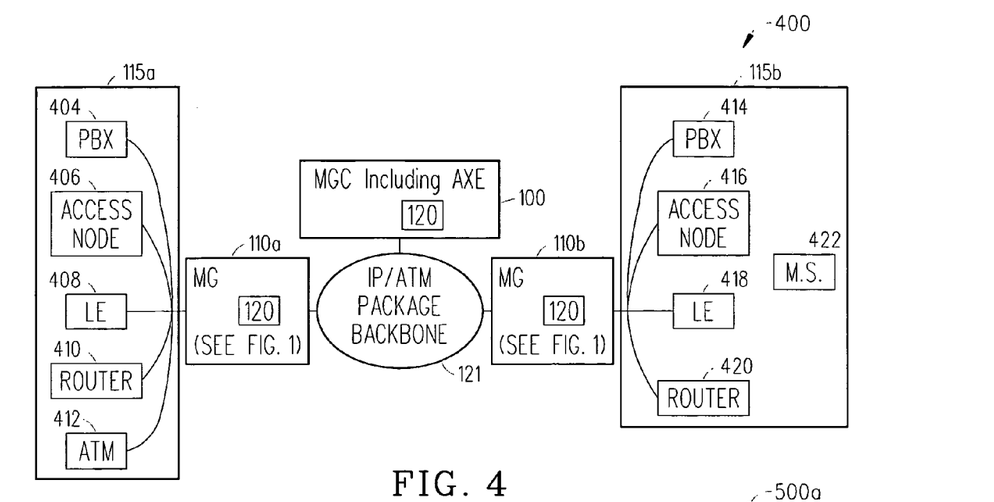
FIG. 4 is a block diagram showing the basic components of an exemplary network which includes a MGC and two MGS that implement the shared risk group package in accordance with the present invention.

The MG 110 basically functions to convert media provided in one type of network to the format required in another type of network (see FIG. 4). For example, the MG 110 could terminate switch circuit network (SCN) bearer channels from a switched circuit network 115 (e.g., DS0s) and media streams from a packet network 121 (e.g., Real-time Transport (RTP) streams in an Internet Protocol (IP) network 121). The MG 110 is capable of full duplex media translations and also capable of processing audio, video and T.120 alone or in any combination. The MG 110 may also: (1) play audio/video messages; (2) perform Interactive Voice Response (IVR) functions; (3) perform media conferencing; (4) support Asynchronous Transfer Mode (ATM) services; (5) support frame relay services; and (6) support IP/Multi Protocol Label Switching (MPLS) services. And, the MGC 100 basically functions to control the parts of a call state that pertains to the control of the connection for media channels in the MG 110.

Figure 3:
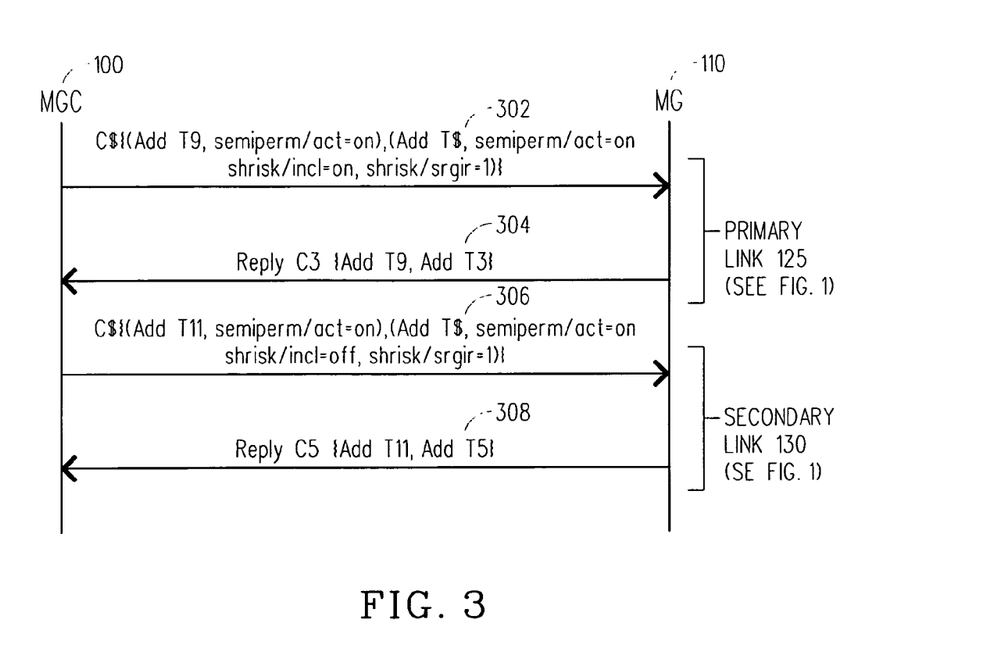
FIG. 3 is a signal sequence chart illustrating the steps of establishing two redundant links in the MG using the shared risk group package in accordance with the present invention.

The exemplary MG 110 shown in FIG. 1 has twelve terminations T1-T12 that can source or sink media and/or control streams. Terminations T1-T6 are ephemeral terminations and are created by an Add command from the MGC 100 and destroyed by Subtract command from the MGC 100 (see FIGS. 3, 5A and 5B). In contrast, terminations T7-T12 are pre-provisioned physical terminations that represent physical entities that have a semi-permanent existence. For example, a physical termination representing a TDM channel might exist for as long as it is provisioned in the MG 110. Whereas, an ephemeral termination representing a RTP flow would typically exist only for the duration of their use. And, a context C1-C6 is simply an association between a collection of 1 or 2 terminations.

In accordance with the present invention, the MGC 110 uses the shared risk group package 120 to control which resources are used by ephemeral terminations T1, T2 . . . T6 in the MG 110 to prevent redundant connections like a primary link 125 and a secondary link 130 from being established which use related resources such as T1 and T2 (for example) because they share the same risk of failure by being associated with a single digital signal processor DSP 1 (for example). A detail description about the shared risk group package 120 is provided below which has been standardized in International Telecommunication Unit's ITU-T H.248.22.

H.248.22 "GCP: Shared Risk Group Package"

1. Scope

When network connections are associated with ephemeral terminations in the MG 110 certain resources are used. A failure in the MG 110 may result in the loss of certain groups of resources, whilst other groups of resources remain unaffected. The resources that share a risk of failure are called a shared risk group SRGI. A shared risk group SRGI is a grouping of the network resources (e.g. IP interfaces) that share the same risk of failure. For example, shared risk group SRGI1 contains a number of IP interfaces T3-T4 located on the same piece of hardware DSP2. And, if DSP2 fails then only terminations T3-T4 in the shared risk group SRGI1 corresponding to the failed resource are affected while other terminations T1-T2 and T5-T6 associated with DSP1 and DSP3 are not affected.

The MGC 100 may select different shared risk groups SRGI when the redundancy of network resources has to be controlled or when the MGC 100 wishes to specify which group of resources are to be used. With this functionality the MGC 100 is given control of the resources used by ephemeral terminations in the MG 110. The MGC 100 may order the MG 110 to use resources from a selected Shared Risk Group SRGI or not use resources from a Shared Risk Group SRGI. This gives an advantage over using traditional Termination ID schemes to link resource groups, in that the MGC 100 can specify certain resources to avoid in which is not possible in the aforementioned CHOOSE ($?) Termination ID scenario.

FIG. 1 shows an example of a scenario where two shared risk groups SRGI1 and SRGI2 have been defined and are used by ephemeral terminations T3-T4 and T5-T6, respectively. In this example, context 3 represents a primary link 125 and context 5 is the secondary link 130.

The shared risk group package 120 may be used whenever the behavior described below in the procedures section is required.

2. Definitions

The Recommendation defines the following term:

2.1 Shared Risk Group

A Shared Risk Group consists of resources or groups of resources that share the same risk of failure. It is the relationship between resources in a MG 100 that defines a shared risk group (see step 202 in FIG. 2).

3. Shared Risk Group Package 120

PackageID: shrisk, 0x006b

Description: This package defines properties and procedures that are used to distinguish between different shared risk groups SRGIs in the MG 100 (see step 204 in FIG. 2).

Designed to be extended only: No

Extends: None 3.1 Properties 3.1.1 Property Name: Include shared risk group (see step 202 in FIG. 2)

PropertyID: incl, 0x0001

Description: The value of this property indicates if the shared risk group specified is requested to be used or to not be used.

Type: Sub-list of type Boolean

Possible Values:

"on" (TRUE) Use resources from the specified SRGI only [Default].

"off" (FALSE) Use resources from any SRGI but the specified SRGI.

Defined in: Termination State Descriptor

Characteristics: Write Only 3.1.2 Property Name: Shared Risk Group Identity Request PropertyID: srgir, 0x0002

Description: The value of this property specifies the shared risk group identity.

Type: Sub-list of type Integer

Possible Values: The values specify the SRGI according to a scheme understood by both MGC 100 and MG 110 (see section 3.2.1.3 for further details).

Defined in: Termination State Descriptor

Characteristics: Write Only 3.1.3 Property Name: Assigned Shared Risk Group Identity PropertyID: asrgi, 0x0003

Description: The value of this property specifies the Shared Risk Group Identity that has been allocated by the MG 110. This value cannot be directly modified by the MGC 100.

Type: Integer

Possible Values: The values specify the SRGI according to a scheme understood by both MGC and MG (see section 3.2.1.2 for further details).

Defined in: Termination State Descriptor

Characteristics: Read Only 3.2 Procedures 3.2.1 Establishment/Modification of Terminations when using Shared Risk Group Package When a MGC 100 determines that an ephemeral termination must use resources belonging to (or different to) a specific shared risk group, an Add/Modify/Move command will be sent to the MG 100 specifying the "Include shared risk group" property and the "Shared risk group identity Request" property.

3.2.1.1 Usage of the "Include Shared Risk Group" Property

The "Include shared risk group" property is used to indicate to the MG 110 if resources from the specified shared risk group identity (shrisk/srgir) must be used for the termination (shrisk/incl=yes) or if resources from the specified risk group identity must not be used for the termination (shrisk/incl=no). If the MGC 100 is not concerned with which shared risk groups are used then it should not include the shrisk/incl and shrisk/srgir properties. The shrisk/incl and shrisk/srgir properties are valid only for the command that they are contained in. They should not be read/audited after the execution of the command. Wildcarding values with CHOOSE ($) or ALL (*) should not be used with shrisk/incl and/or shrisk/srgir. For example, in the case of a semi-permanent connection and a protective secondary link, by specifying (shrisk/incl=on, shrisk/srgi=1) for the primary link 125 (see Add command 302 and Reply command 304 in FIG. 3) and by specifying (shrisk/incl=off, shrisk/srgi=1) for the secondary link 130 (see Add command 306 and Reply command 308 in FIG. 3), the MGC 100 is assured that the primary link 125 and the secondary link 130 do not share the same groups of resources (see FIGS. 1 and 3).

The MGC may provide a sub-list of shrisk/incl and shirsk/srgir to the MG 110 to enable the MGC 100 to request that certain shared risk groups be used and other shared risk groups should not be used. The first value of shrisk/incl in the sub-list corresponds to the first value of shrisk/srgir sub-list. For instance, the MGC 100 may send an ADD command such as "C${Add${TerminationStateDescriptor{shrisk/incl=off, on, on, off shrisk/srgir=1, 2, 3, 4}}}. This Add command would indicate that the MG 110 shall use resources from Shared Risk Groups 2 and 3 but not from 1 and 4.

3.2.1.2 Usage of the "Assigned Shared Risk Group Identity" Property

The "Assigned Shared Risk Group Identity (shrisk/asrgi)" contains the accumulated shared risk identities of the resources used by the termination. This value cannot be directly written by the MGC 100 however it can indirectly be influenced by adding, modifying or subtracting resources from the termination. The MGC 100 can audit this property to determine the shared risk groups used by a termination.

3.2.1.3 Usage of the "Shared Risk Group Identity" Property

It should be appreciated that the different resources used by a termination may have different "Shared Risk Group Identity" ranges. However it is assumed that this will be operator configurable and provisioned on both the MGC 100 and MG 110 so that they have a mutual understanding of the Specified Risk Group identity scheme. For example, a binary structure of the property can be used i.e. the shrisk/srgi decimal integer could be treated as a four byte binary number within the MGC 100 and MG 110. This way different bytes or groups of bits may be used to address different types of resources in the MG 110. For example, the first two bytes could be used to identify DSP resources while the last two bytes could identify interface boards on the MG 110. When sent over the GCP link 135, the binary number is however expressed as a decimal number integer.

4. Summary

The Shared Risk Package 120 enables the MGC 100 to indicate to the MG 110 to use or to not use network resources associated with a shared risk group when setting up connections 125 and 130. When network connections are associated with ephemeral terminations in the MG 110 certain resources are used. A failure in the MG 110 may result in the loss of certain groups of resources, whilst other groups of resources remain unaffected. The resources that share a risk of failure are called a shared risk group. A shared risk group is simply a grouping of the network resources (e.g. IP interfaces) sharing the same risk of failure. Each shared risk group could for example contain a number of IP interfaces located on the same piece of hardware. If a resource failure occurs only terminations in the shared risk group corresponding to the failed resource are affected while other terminations are not.

It should be appreciated that ITU-T H.248.22 is associated with ITU-T H.248.1 entitled "Gateway Control Protocol". The contents of ITU-T H.248.1 are hereby incorporated herein.

Referring to FIG. 4, there is a block diagram showing the basic components of an exemplary network 400 that can incorporate a MGC 100 and two MGs 110*a* and 110*b* that implement the shared risk group package 120 in accordance with the present invention. It should be appreciated that network 400 (e.g., Ericsson's ENGINE Integral 3.0 Network) is exemplary and that other types and configurations of networks can also implement the shared risk group package 120 in accordance with the present invention.

As shown, the network 400 includes the MGC 100 (shown including an AXE) and an IP/ATM packet network 121. The MGC 100 is also shown to include the share risk group package 120. Further, the network 400 includes two MGs 110*a* and 110*b* that interface with the IP/ATM packet network 121. MG 110*a* also interfaces with a switched circuit network 115*a* that includes the following components: (1) a Private Branch Exchange (PBX) 404; (2) an Access Node 406; (3) a Local Exchange (LE) 408; (4) a Router 410; and (5) an Asynchronous Transfer Mode (ATM) switch 412 (for example). Likewise, MG 110*b* also interfaces with a switched circuit network 115*b* that includes the following components: (1) a PBX 414; (2) an ENGINE Access ramp 416; (3) a LE 418; and (4) a Remote Subscriber Stage 420 (for example). Lastly, the network 400 also includes a management system 422.

In operation, the MGC 100 uses the shared risk group package 120 to control which resources are used by ephemeral terminations in MGs 110*a* and 110*b* to prevent redundant connections from being established in either MG 110*a* or 110*b* which use related resources that share the same risk of failure. A detail description about how the MGC 100 can use the shared risk group package 120 to establish a primary path (path #1) and a second patch (path #2) in MGs 110*a* and 110*b* is provided below with respect to the sequence charts in FIGS. 5A and 5B.

Figure 5A:
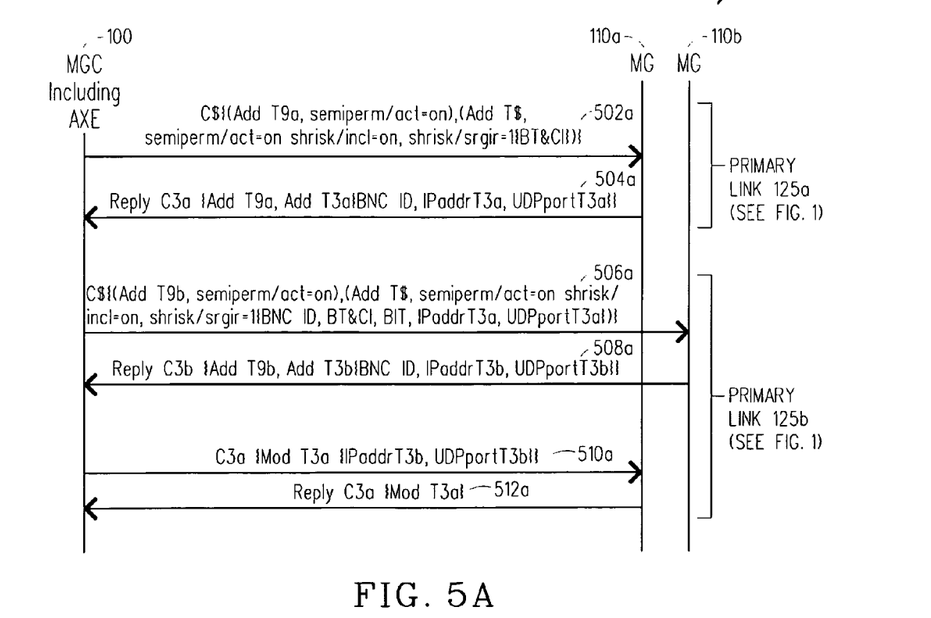
FIGS. 5A and 5B are signal sequence charts illustrating the steps of establishing two redundant links in the two MGs of the network shown in FIG. 4 using the shared risk group package in accordance with the present invention.
Figure 5B:
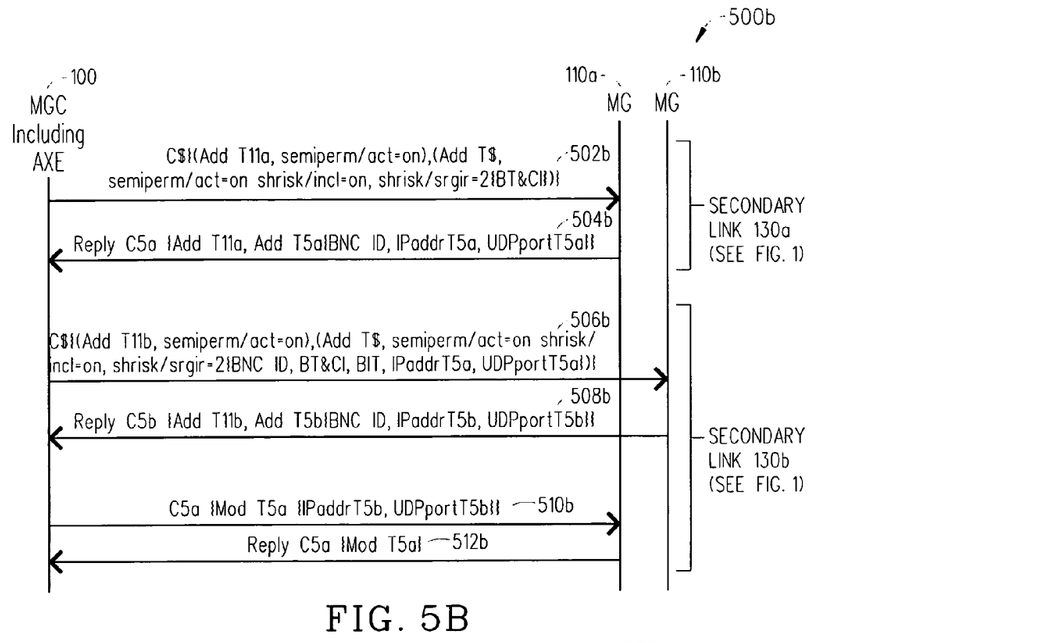

Referring to FIGS. 5A and 5B, there are shown two signal sequence charts 500*a* and 500*b* that illustrate the steps of establishing two redundant links in the MGs 110*a* and 110*b* of network 400 using the shared risk group package 120 in accordance with the present invention. The signal sequence chart 500*a* illustrates the messaging required for the establishment of a primary path (path #1) including two primary links 125*a* and 125*b* in MGs 110*a* and 110*b*. And, the signal sequence chart 500*b* illustrates the messaging required for the establishment of a secondary path (path #2) including two secondary links 130*a* and 130*b* in MGs 110*a* and 110*b*.

As shown in FIG. 5A, the signal sequence chart 500*a* indicates how primary links 125*a* and 125*b* can be established in MGs 110*a* and 110*b*. First, the MGC 100 sends an ADD command 502*a* (which includes bearer type and codec information (BT & CI)) to MG 110*a* which then chooses a User Datagram Protocol (UDP) Port # on an interface corresponding to the specified SRGI1 (for example). MG 110a then reserves an IP ephemeral termination T3a (for example) on the appropriate DSP2 and establishes a cross connection between the appropriate physical termination T9a and the reserved IP ephemeral termination T3a (e.g., see T3 and T9 in FIG. 1). MG 110a then sends an ADD REPLY command 504a to the MGC 100 with a chosen ContextId, termination Ids, BackBone Network Connection (BNC) ID, IP address of the interface and the UDP Port #. Thereafter, the MGC 100 sends an ADD command 506a to MG 110b which then chooses a User Datagram Protocol (UDP) Port # on an interface corresponding to the specified SRGI1 (for example). MG 110b then reserves an IP ephemeral termination T3b (for example) on the appropriate DSP2 and establishes a cross connection between the appropriate physical termination T9b and the reserved IP ephemeral termination T3b (e.g., see T3 and T9 in FIG. 1). MG 110b then sends an ADD REPLY command 508a to the MGC 100 with a chosen ContextID, termination Ids, BackBone Network Connection (BNC) ID, IP address of the interface and the UDP Port #. The MGC 100 then sends a MODIFY command 510a to MG 110a which includes the reserved UPD port and IP address information associated with MG 110b. MG 110a then sends a MODIFY REPLY command 512a to the MGC 100. Thereafter, MGC 100 completes the establishment of the primary link 125a in MG 110a and the primary link 125b in MG 110b. It should be appreciated that MGs 110a and 110b have the same configuration as the exemplary MG 100 shown in FIG. 1.

As shown in FIG. 5B, the signal sequence chart 500b indicates how secondary links 130a and 130b can be established in MGs 110a and 110b. First, the MGC 100 sends an ADD command 502b (including bearer type and codec information (BT & CI)) to MG 110a which then chooses a User Datagram Protocol (UDP) Port # on an interface corresponding to the specified SRGI2 (for example). MG 110a then reserves an IP ephemeral termination T5a (for example) on the appropriate DSP3 and establishes a cross connection between the appropriate physical termination T11a and the reserved IP ephemeral termination T5a (e.g., see T5 and T1 in FIG. 1). The MG 110a then sends an ADD REPLY command 504b to the MGC 100 with a chosen ContextID, termination Ids, BackBone Network Connection (BNC) ID, IP address of the interface and the UDP Port #. Thereafter, the MGC 100 sends an ADD command 506b to MG 110b which then chooses a User Datagram Protocol (UDP) Port # on an interface corresponding to the specified SRGI2 (for example). MG 110b then reserves an IP ephemeral termination T5b (for example) on the appropriate DSP3 and establishes a cross connection between the appropriate physical termination T11b and the reserved IP ephemeral termination T5b (e.g., see T5 and T11 FIG. 1). MG 110b then sends an ADD REPLY command 508b to the MGC 100 with a chosen ContextId, termination Ids, BackBone Network Connection (BNC) ID, IP address of the interface and the UDP Port #. The MGC 100 then sends a MODIFY command 510b to MG 110a which includes the reserved UDP port and IP address information associated with MG 110b. MG 110b then sends a MODIFY REPLY command 512b to the MGC 100. Thereafter, MGC 100 completes the establishment of the secondary link 130a in MG 110a and the secondary link 130b in MG 110b. It should be appreciated that the primary links 125a and 125b do not share related resources with the secondary links 130a and 130b in MGs 110a and 110b.

Figure 6:
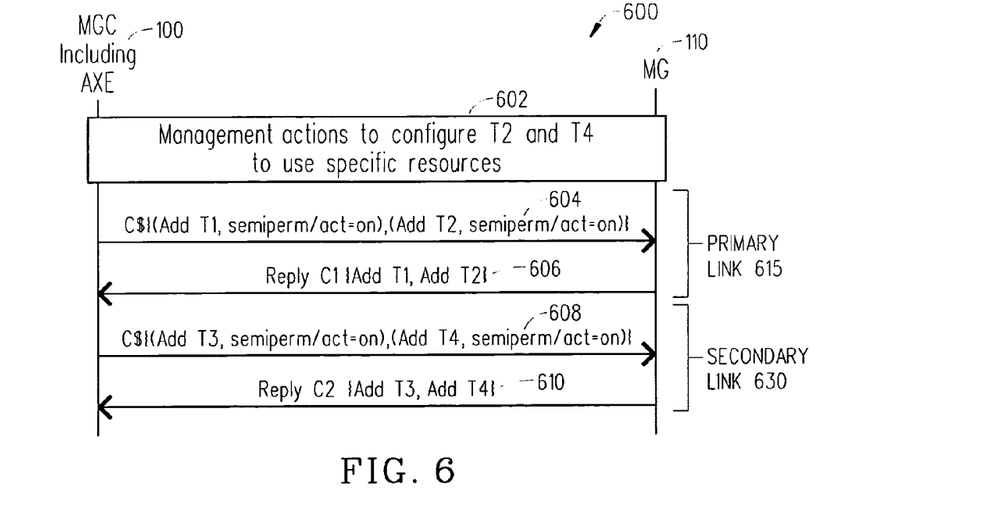
FIG. 6 is a signal sequence chart illustrating an alternative way of establishing two redundant links in a MG without implementing the shared risk group package in accordance with the present invention.

Referring to FIG. 6, there is a signal sequence chart 600 that illustrates an alternative way of establishing two redundant links in the MG 110 without implementing the shared risk group package 120 in accordance with the present invention. In this embodiment, the shared risk group package 120 is not used so as shown in block 602 of the signal sequence chart 600 there needs to be some management actions to configure terminations T2 and T4 (for example) to use specific resources that do not share the same risk of failure. The terminations T1 and T2 are already pre-provisioned physical terminations. Then, the MGC 100 sends an Add command 604 to MG 110 specifying that two semi-permanent connections T1 and T2 are to be used to establish a primary link 125. The MG 110 then sends a Reply command 606 back to the MGC 100 containing the ContextID and termination Ids T1 and T2. Thereafter, the MGC 100 sends another Add command 608 to MG 110 specifying that two semi-permanent connections T3 and T4 are to be used to establish a secondary link 130. The MG 110 then sends a Reply command 610 back to the MGC 100 containing the ContextId and termination Ids T3 and T4. At this point, the primary link 625 and secondary link 630 which do not share related resources are established in MG 110. It should be appreciated that less manual work is expected when the shared risk group package 120 as shown in FIGS. 1-5 is used than if the terminations need to be individually configured as shown in FIG. 6. It should also be appreciated that the numbers associated with the terminations T1, T2, T3 and T4 in the signal sequence chart 600 do not correspond with the termination numbers T1-T12 in the MGs 110 shown in FIGS. 1 and 4.

From the foregoing, it can be readily appreciated by those skilled in the art that the present invention provides a shared risk group package that enables the MGC to indicate to the MG to use or to not use network resources that share the same risk of failure when setting-up connections. As such, the MGC can use the shared risk group package to prevent redundant links like a primary link and a secondary link from being established in a MG that use related resources which share the same risk of failure by controlling which resources are used to establish the ephemeral terminations that are associated with the primary link and the secondary link.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A media gateway controller, comprising:

means for implementing a shared risk group package, wherein said shared risk group package defines the termination resources that share the same risk of failure as a shared risk group and wherein said shared risk group package defines properties used by said media gateway controller to distinguish between different shared risk groups when establishing the multiple connections within a media gateway, said shared risk group package defining the following properties:

an include shared risk group property (referred to as "shrisk/incl") that specifies if one of the shared risk groups is to be used or not to be used to establish one of the connections within said media gateway;

a shared risk group identity request property (referred to as "shrisk/srgir") that specifies an identity of one of the shared risk groups;

an assigned shared risk group identity property (referred to as "shrisk/asrgi") that specifies an identity of one of the shared risk groups that has been allocated by said media gateway, and said means communicating with the media gateway whether said media gateway should use termination resources which share the same risk of failure to establish multiple connections;

wherein said media gateway controller sends to said media gateway, a command that the shared risk group property is "on" and shared risk group identity request property is "x" wherein "x" specifies a particular shared risk group that is to be used when said media gateway establishes the primary link when said multiple connections include a primary link and a secondary link;

and further wherein said media gateway controller sends to said media gateway a command that the shared risk group property is "off" and the shared risk group identity request property is "x" which specifies that the media gateway is to establish the secondary link by using a shared risk group other than the shared risk group "x" that is being used by the primary link.

2. A method for enabling a media gateway controller to control a media gateway, said method comprising the steps of:

identifying the termination resources that share the same risk of failure and defining those termination resources as a shared risk group; and enabling the media gateway controller to use a shared risk package to distinguish between different shared risk groups when establishing a primary link and a secondary link within said media gateway, wherein said shared risk group package defines properties used by said media gateway controller to distinguish between the different shared risk groups when establishing the multiple connections within said media gateway, said shared risk group package defining the properties of:

an include shared risk group property (referred to as "shrisk/incl") that specifies if one of the shared risk groups is to be used or not to be used to establish one of the connections within said media gateway;

a shared risk group identity request property (referred to as "shrisk/srgir") that specifies an identity of one of the shared risk groups; and an assigned shared risk group identity property (referred to as "shrisk/asrgi") that specifies an identity of one of the shared risk groups that has been allocated by said media gateway';

wherein said media gateway controller performs the following steps:

sending, to said media gateway, a command including shrisk/incl=on and shrisk/srgi=x which specifies a particular shared risk group x that is to be used when said media gateway establishes the primary link; and sending, to said media gateway, a command including shrisk/incl=off and Shrisk/srgi=x which specifies that the media gateway is to establish the secondary link by using another shared risk group besides the shared risk group x that is being used by the primary link.

\* \* \* \* \*

UNITED STATES PATENT AND TRADEMARK OFFICE
CERTIFICATE OF CORRECTION

| | | |
|---|---|---|
| PATENT NO. | : 7,457,237 B2 | Page 1 of 1 |
| APPLICATION NO. | : 10/770948 | |
| DATED | : November 25, 2008 | |
| INVENTOR(S) | : Jerker Mattias Zetterlund and Paul R. Wilson | |

It is certified that error appears in the above-identified patent and that said Letters Patent is hereby corrected as shown below:

In the Claims

In column 9, lines 28-29, replace "shared risk package" with -- shared risk group package --.
In column 10, line 21, replace "shrisk/srgi" with -- shrisk/srgir --.
In column 10, line 25, replace "Shrisk/srgi" with -- shrisk/srgir --.

Signed and Sealed this
Second Day of February, 2016

Michelle K. Lee
*Director of the United States Patent and Trademark Office*